United States Patent
Udd (10) Patent No.: US 8,400,462 B2
(45) Date of Patent: Mar. 19, 2013

(54) CODE PROCESSING IN ELECTRONIC TERMINAL

(75) Inventor: Sture Udd, Vaasa (FI)

(73) Assignee: UPC Konsultointi Oy, Vaasa (FI)

( * ) Notice: Subject to any disclaimer, the term of this patent is extended or adjusted under 35 U.S.C. 154(b) by 1280 days.

(21) Appl. No.: 12/087,872

(22) PCT Filed: Jan. 15, 2007

(86) PCT No.: PCT/FI2007/050016
§ 371 (c)(1),
(2), (4) Date: Jul. 16, 2008

(87) PCT Pub. No.: WO2007/080231
PCT Pub. Date: Jul. 19, 2007

(65) Prior Publication Data
US 2010/0150436 A1 Jun. 17, 2010

(30) Foreign Application Priority Data
Jan. 16, 2006 (FI) .................. 20065025

(51) Int. Cl.
| G09G 5/00 | (2006.01) |
| G09G 5/02 | (2006.01) |
| G09G 5/10 | (2006.01) |
| H04N 11/00 | (2006.01) |
| H04N 5/445 | (2006.01) |
| H04N 5/57 | (2006.01) |
| H04N 5/14 | (2006.01) |
| H04N 1/46 | (2006.01) |
| H04N 1/40 | (2006.01) |
| G06K 9/38 | (2006.01) |
| G06K 9/34 | (2006.01) |
| G06K 9/40 | (2006.01) |
| G06F 3/048 | (2006.01) |

(52) U.S. Cl. ........ 345/589; 345/581; 345/593; 345/619; 345/654; 345/690; 348/552; 348/564; 348/557; 348/602; 348/671; 358/505; 358/448; 382/163; 382/169; 382/172; 382/173; 382/274; 715/759; 715/781

(58) Field of Classification Search .................. 345/581, 345/589, 593–594, 606, 619, 654, 690; 348/552, 348/557, 564–568, 602–603, 687, 671; 358/505, 358/518, 448, 453; 382/163–164, 166–167, 382/169–172, 173, 254, 274, 276; 715/759, 715/764
See application file for complete search history.

(56) References Cited

U.S. PATENT DOCUMENTS
5,689,665 A * 11/1997 Mitsui et al. .................. 715/803
6,381,506 B1 * 4/2002 Grappone ...................... 700/79
(Continued)

FOREIGN PATENT DOCUMENTS
JP 2003-90155 A 3/2003
WO WO-2005/124657 A1 12/2005

OTHER PUBLICATIONS
McCune, J.M. et al., 2005 IEEE Symposium on Security and Privacy, May 8-11, 2005, pp. 110-124.

*Primary Examiner* — Wesner Sajous
(74) *Attorney, Agent, or Firm* — Birch, Stewart, Kolasch & Birch, LLP (57) ABSTRACT

The invention relates to a method of locating a code in an image file, comprising forming an image window from a target comprising a readable code, dividing the image window into sub-windows, analysing for each sub-window whether it constitutes a part of the code by comparing the variation density color of the sub-window with one or more threshold values set for the color, gathering the sub-windows evaluated as constituting a part of the code into a group of sub-windows, and verifying that the gathered group of sub-windows defines a valid code.

18 Claims, 6 Drawing Sheets

U.S. PATENT DOCUMENTS

| | | |
|---|---|---|
| 2003/0061342 A1* | 3/2003 | Abdelhadi et al. ............ 709/224 |
| 2004/0000589 A1 | 1/2004 | Smith et al. |
| 2005/0029358 A1 | 2/2005 | Mankins |
| 2005/0059339 A1 | 3/2005 | Honda et al. |
| 2008/0107341 A1* | 5/2008 | Lu ................................ 382/190 |

* cited by examiner

CODE PROCESSING IN ELECTRONIC TERMINAL

FIELD OF THE INVENTION

The invention relates to code processing in an electronic terminal.

BACKGROUND OF THE INVENTION

The use of paper and other printable material will keep its strong position for yet a long time. However, electronic applications are gaining ground, and the more this happens, the more important the integration between the printing material and electronic media becomes.

The solutions currently in use are the first step in the direction marked by the future, but for the integration of printed and electronic media to achieve the level where large user masses will adopt the services, more effort is needed to improve the quality of the services and to introduce new forms of service.

BRIEF DESCRIPTION OF THE INVENTION

It is thus an object of the invention to improve the integration between different media types.

The invention therefore relates to a method for processing event-specific matrix information, which comprises reading in a first mobile phone a first matrix code associated with a product to be purchased, transmitting the first matrix code from the first mobile phone to a first administrative unit. The method further comprises forming an unique second matrix code in the first administrative unit on the basis of the first matrix code, receiving the second matrix code in the first mobile phone, reading with the camera of a second mobile phone the second matrix code from the display of the first mobile phone, transmitting from the second mobile phone the second matrix code to a second administrative unit, verifying in the second administrative unit that the second matrix code grants authorization to a desired event, and transmitting information on the authorization to the second mobile phone.

The invention also relates to a method for processing event-specific matrix information, which comprises reading a first matrix code in a first mobile phone. The method further comprises transmitting the first matrix code from the first mobile phone to an administrative unit, receiving in the first mobile phone an unique second matrix code formed in a control device on the basis of the first matrix code, and showing the received unique second matrix code on the display of the first mobile phone for reading by the camera of a second mobile phone.

The invention also relates to a method for processing event-specific matrix information. The method comprises reading with a second mobile phone from the display of a first mobile phone an unique second matrix code that the first mobile phone has received in response to a first matrix code transmitted by the first mobile phone to a control device, transmitting the second matrix code from the second mobile phone to an administrative unit, receiving from the administrative unit information on whether the second matrix code grants authorization to an event, and displaying the authorization information on the second mobile phone.

The invention also relates to an arrangement for processing event-specific matrix information, which comprises a first mobile phone, a first administrative unit connected to the first mobile phone, a second mobile phone, and an administrative unit connected to the second mobile phone, the first mobile phone comprising means for reading a first matrix code. The first mobile phone comprises means for transmitting the first matrix code to the first administrative unit, the first administrative unit comprises means for forming a second matrix code, the first mobile phone comprises means for receiving the second matrix code, the second mobile phone comprises means for reading the matrix code from the display of the first mobile phone and means for transmitting the second matrix code to the second administrative unit, the second administrative unit comprises means for verifying whether the second matrix code grants authorization to a desired event and means for transmitting information on the authorization to the second mobile phone.

The invention also relates to a mobile phone for processing event-specific matrix information, which comprises means for reading a first matrix code and means for transmitting the first matrix code to an administrative unit. The mobile phone comprises means for receiving a unique second matrix code formed in a control device on the basis of the first matrix code, and a display for showing the received second matrix code visually to be read with the second mobile phone.

The invention also relates to a mobile phone for processing event-specific matrix information. The mobile phone comprises means for reading a matrix code from the display of a first mobile phone, means for transmitting the matrix code to an administrative unit, means for receiving from the administrative unit information on whether a second matrix code grants authorization to an event, and means for showing the authorization information on a second mobile phone.

The invention also relates to a computer program. The computer program comprises computer program code means that are arranged to execute all steps of any one of the methods described in the method claims as the program is run on a computer.

Preferred embodiments of the invention are disclosed in the dependent claims.

The method and system of the invention provide the advantage that by utilizing essentially real-time information, it is possible to create a basis for a large number of applications.

BRIEF DESCRIPTION OF FIGURES

The invention will now be described in greater detail by means of the preferred embodiments and with reference to the attached drawings, in which.

DETAILED DESCRIPTION OF THE INVENTION

One embodiment of the invention focuses on code identification. The code can be a one- or two-dimensional bar code, a matrix code, for instance. Both are open and known standards for the presentation of binary information. A one-dimensional bar code can be used to mark price information of a product into the product package. A two-dimensional code, such as a smart code, can be printed on the page of a newspaper, for instance. By reading the smart code with the camera of a mobile phone, for instance, it is possible to link the mobile phone to the web page defined by the code.

Figure 1:
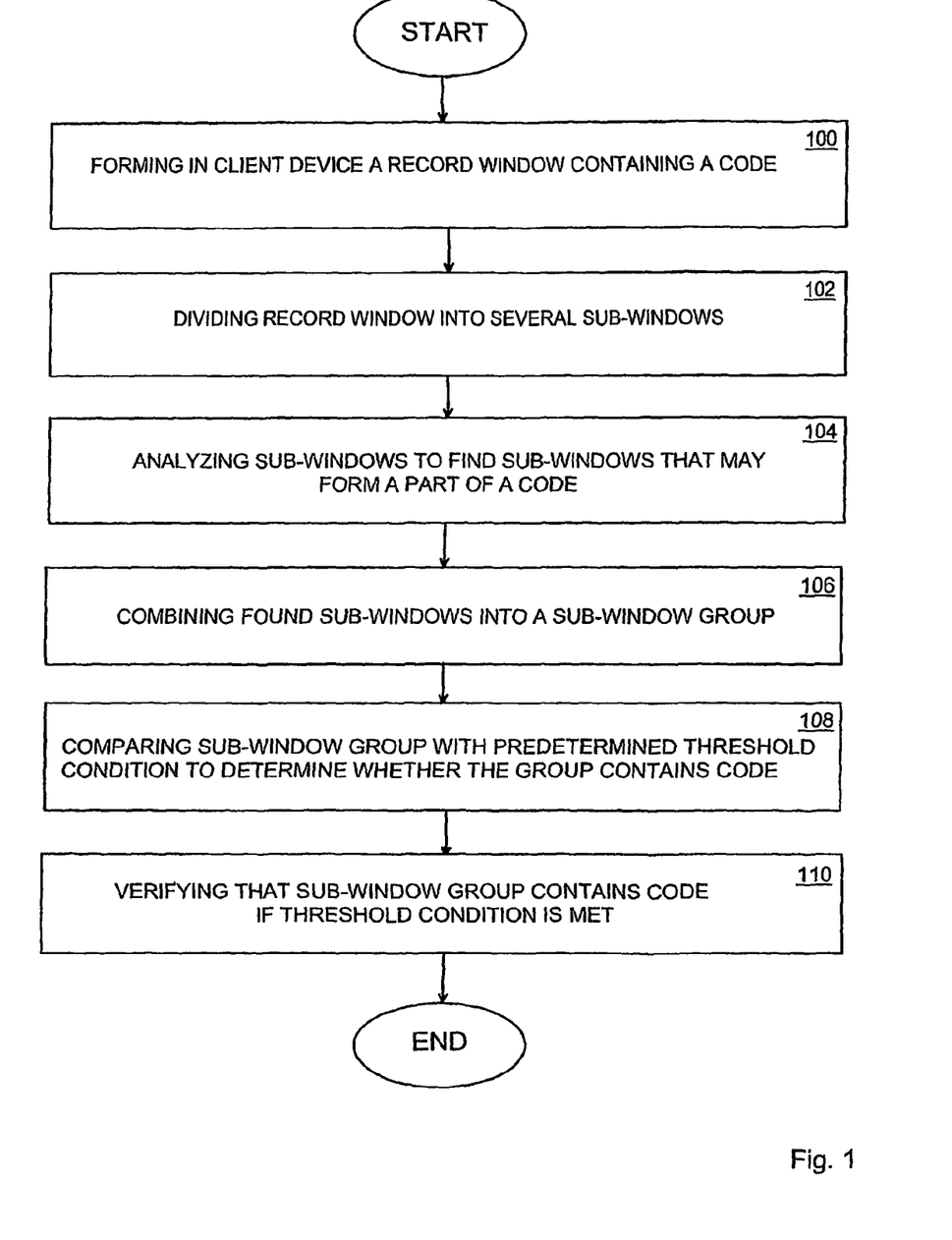
FIG. 1 shows one embodiment of the method.

The method according to the embodiment is described in FIG. 1. In the initial step 100, a client device forms a window containing a code, which the device can store as a record. This means that the dimensions of the window to be formed are large enough that the code fits into it. For instance, let us assume that an image (i.e. record) is generated with the camera of a mobile phone from a page of a book that contains a standard two-dimensional intelligent box of black and white squares. The outer dimensions of the window defining the record are such that the code fits inside it, and at the edges of the code, the record may even have a small safety clearance to ensure that all information in the code can be captured.

In step 102 of the method, a window defined by the record is split into several sub-windows that can be stored as sub-records in the device. The sub-windows, like the window formed in step 100, can be square, but other shapes are also possible. The number of sub-windows can vary, and the invention is not bound to the number of windows.

In step 104, the sub-records are analyzed one at a time to find the sub-records that could form part of the code. The analysis can be a grey-scale analysis, for instance, in which for each sub-record a variation density is estimated, on the basis of which the sub-record can be marked as a partial code or some other area. Any sub-records exceeding a preset white variation density threshold are interpreted as white and any sub-records exceeding a preset black variation density threshold are interpreted as black. Sub-records with a colour somewhere in the middle of these thresholds can be rejected, that is, they are not interesting for the analysis. The thresholds can be set according to lighting conditions.

The shape of the group formed by the sub-records can also be taken into consideration when gathering the sub-records together. An optimally square group can be sought for a sub-record group.

In step 106, the analysis result of step 104 is examined as a whole. The sub-windows that have been interpreted as black or white are then gathered together. This analysis endeavors to estimate whether there is among the sub-records a group of adjacent sub-records that contains a sufficient number of white and black areas. A percentual threshold condition, for instance, can be used for this estimation. The threshold condition can be such for instance that if in a given area at least 75% of the sub-windows of a certain part are black or white, the group formed by the sub-windows is interpreted as containing a code.

The embodiment thus relates to a method for locating a code in an image file, the method comprising the following method steps: forming an image window from a target comprising a readable code, dividing the image window into sub-windows, defining for each sub-window whether it constitutes a part of the code by comparing the variation density colour of the sub-window with one or more threshold values set for the colour, gathering the sub-windows constituting a part of the code into a group of sub-windows on the basis of a threshold value set for the shape of the group, and verifying that a code file defines a readable code, if the threshold condition based on shape and set for a group of sub-windows is met.

The embodiment also relates to a device arrangement for locating a code in an image file. The arrangement comprises means for forming an image window of a target comprising a readable code, means for dividing the image window into sub-windows, means for defining for each sub-window whether it constitutes a part of the code by comparing the variation density colour of the sub-window with one or more threshold values set for the colour, means for gathering the sub-windows forming a part of the code together into a sub-window group on the basis of a threshold condition set for the shape of the group, and means for verifying that a code file defines a readable code, if the threshold condition based on shape and set for a group of sub-windows is met.

The embodiment described above can be implemented in a mobile station, for instance. The code can be read for instance from a printed publication or the display of another mobile station, and it can be a one- or two-dimensional bar code or some other standardized code. An image window refers to a physical and visible form of a code. In practice, the information in the image window is processed numerically in the device. The embodiment can be implemented in the device by a program, with ASIC (Application Specific Integrated Circuit) or logic components. A program implementing the embodiment can be stored as a program run in the processor of the device and also in a separate transfer medium. The program implementing the method can also be processed as a software product that is also transferable without a physical transfer medium.

Figure 2:
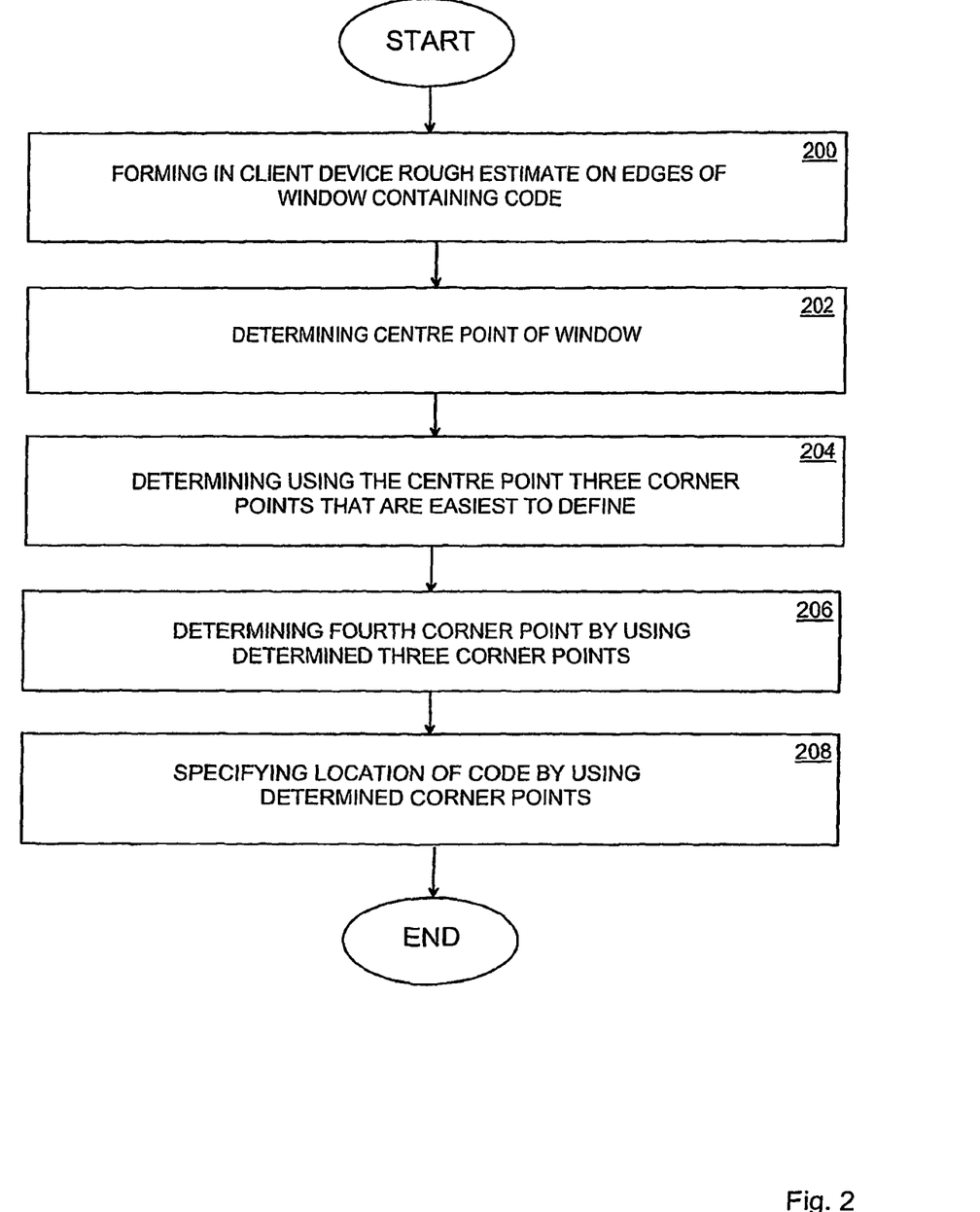
FIG. 2 shows a second embodiment of the method.

FIG. 2 shows a second embodiment of the method. An invention that comprises steps for finding the corner points of a code. The embodiment relates to a situation in which an electronic terminal, such as a mobile phone, has formed an image file of a target. The target comprises a code that can be a one- or two-dimensional bar code (data matrix) or some other corresponding standardized code. There are several standards for data matrix codes, an example of which is "EIA 802—Electronics Industry Marking Standard."

In the beginning of the method, an image window is formed at a low resolution of a target containing a code, and the image window, or a real-time representation of the window, such as a file, is manipulated in such a manner that a code file is obtained that is limited by approximate accuracy to a readable code. In one embodiment, the above-mentioned approximate positioning 200 of the location of the code is done according to the method of FIG. 1.

In the next step 202 of the method, the centre point of the code is determined, the centre point preferably being at the intersection of the midpoints of the longitudinal and lateral directions. Optimally, the code file formed in method step 200 is square, but due to an oblique (non-perpendicular) camera angle to the target, the code file may have a perspective error, in which case the graphical representation of the code file is not necessarily a square.

In step 204, three most easily determinable corner points are defined in such a manner that the corner points of an L-shaped partial figure are found. The three points that best fit the L shape define the location of the L figure. At this stage, the orientation is also determined, that is, whether the branches of the L figure are parallel to the image file. When the figure is parallel to the image, the corner points are determined by combining the horizontal and vertical coordinates.

In step 206, a fourth corner point is determined using the three corner points determined in step 204. Because the code to be used is square, for instance, the fourth point is easy to determine using the three corner points. After the fourth corner point is exactly defined, all the corner points of the code have been found, and the exact location of the code is known. The exact location of the code can thus be specified within the frame formed in step 200.

The embodiment thus relates to a method for determining the location of a code in an image file, the method comprising the following method steps: forming an image file of a target comprising a readable code, limiting by using a low resolution the image file into a code file in such a manner that the image file essentially comprises only an area of the size of the readable code, determining the centre point of the code file, finding the three best corner points of the code file with respect to the centre point, determining by means of the found three corner points a fourth corner point of the code file, and specifying the definition of the code file into the area inside the corner points.

The embodiment also relates to a device for defining the location of a code in an image file, the device comprising means for forming an image file of a target comprising a readable code, means for limiting by using a low resolution the image file into a code file in such a manner that the image file essentially only comprises an area the size of the readable code, means for determining the centre point of the code file, means for finding the three best corner points of the code file with respect to the centre point, means for determining a fourth corner point of the code file by means of the found three corner points, and means for specifying the definition of the code file into the area inside the corner points.

The embodiment described above can be implemented in a mobile station, for instance. The code can be read with the camera of the mobile station for instance from a printed publication or the display of a second mobile station, and the code can be a one- or two-dimensional bar code or some other standardized code. An image window refers to a physical and visible form of a code. In practice, the information in the image window is processed numerically in the device. The embodiment can be implemented in the device by a program, with ASIC (Application Specific Integrated Circuit) or logic components. A program implementing the embodiment can be stored as a program run in the processor of the device and also in a separate transfer medium. The program implementing the method can also be processed as a software product that is also transferable without a physical transfer medium. The specific code file obtained as a result of the processing can as such be suitable for further use (in information decoding), or it can be further processed by filtering, for instance.

Figure 3:
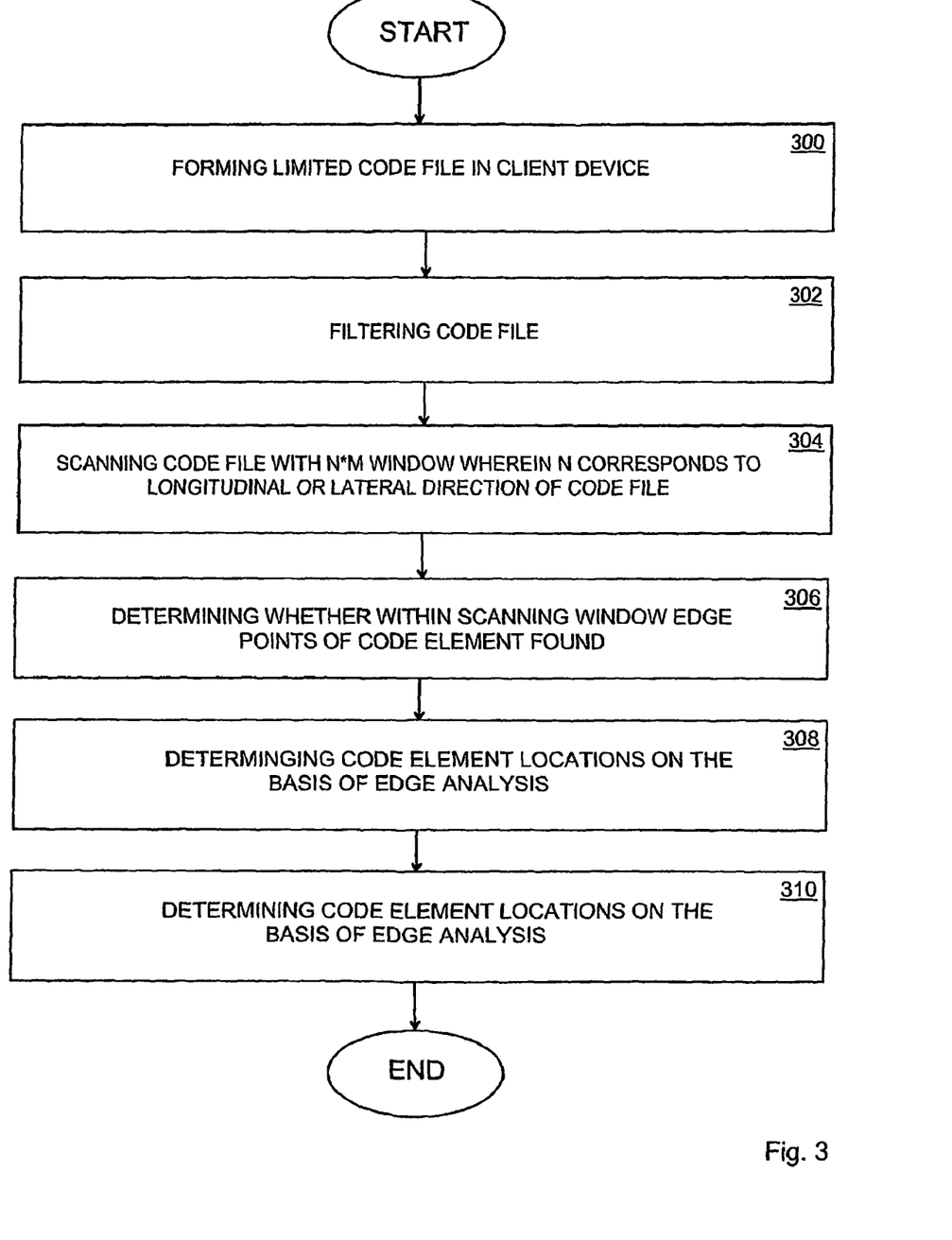
FIG. 3 shows a third embodiment of the method.

FIG. 3 shows the filtering of a code file according to an embodiment. In the beginning of the method, in step 300, a limited code file that contains a readable code is formed. In one embodiment, the code file is defined with the method of FIG. 2. In step 302, noise is filtered from the code file with a low-pass filter, for instance. In step 304, the code is scanned with a N*M-sized scanning window that in one dimension (N) is equal to the longitudinal or lateral dimension of the code file and in the other dimension (M) equal to the size of the structural element, i.e. image pixel. This way, the scanning has as high a resolution as possible.

Step 306 specifies the scanning. In the scanning step, a decision is made for each pixel whether it represents an edge point of the image element of the code. For the image elements, it is possible to calculate a metrics value related to scanning, which can be a median, variance, or the like, and compare it with a predefined threshold value.

The image element of the code refers herein to the white or black dots or areas of the code. According to a standard defined by a two-dimensional code, a black dot refers to zero and a white dot to one. Thus, a two-dimensional matrix code represents a two-dimensional binary table that is capable of presenting very complex information. The standard may define that one of the corner points is white.

In step 308, the code is specified by defining the correct location of the code elements by means of corner points. After the location of the code elements is defined, any necessary corrections can be made to the code. For instance, black structural elements left inside a white code element can easily be amended to white like the surrounding structural elements.

One step in the scanning is that after each scanning round, it is possible to estimate whether the edge of the code elements has been reached. This can be estimated using a predefined threshold condition. The threshold condition can for instance be that a third of the code elements seem to change from white to black. It is then probable that the edge has been reached, and earlier scans can be amended between the previous edge and new edge, for instance.

The obtained code can be checksum-calculated as defined in the standard. The obtained code can also be compared with the closest codes by setting the found code on top of the known codes and thus determining the information content of the code.

The method can also be implemented by having the corner point analysis of FIG. 2 as part of the high-resolution scanning of FIG. 3. The corner points are then searched for in FIG. 3 by using the edges of the code elements and the entire edge of the code area.

Thus, the embodiment relates to a method for improving the quality of a code file, the method comprising the following method steps: reading a code file comprising code elements, scanning the code file with a two-dimensional scanning window that in one dimension is equal to the longitudinal or lateral dimension of the code file and in the other dimension equal to the size of the structural element of the image, comparing in the scanning window each structural element to see whether a point of the code is reached where the threshold condition for finding the edge of the code elements is met, and if this is the case, amending the scanned structural elements on the basis of the found code element edge.

The embodiment also relates to a device implementing the method. Further, the embodiment relates to a computer software product that when run on the device implements the above-mentioned method.

Figure 4:
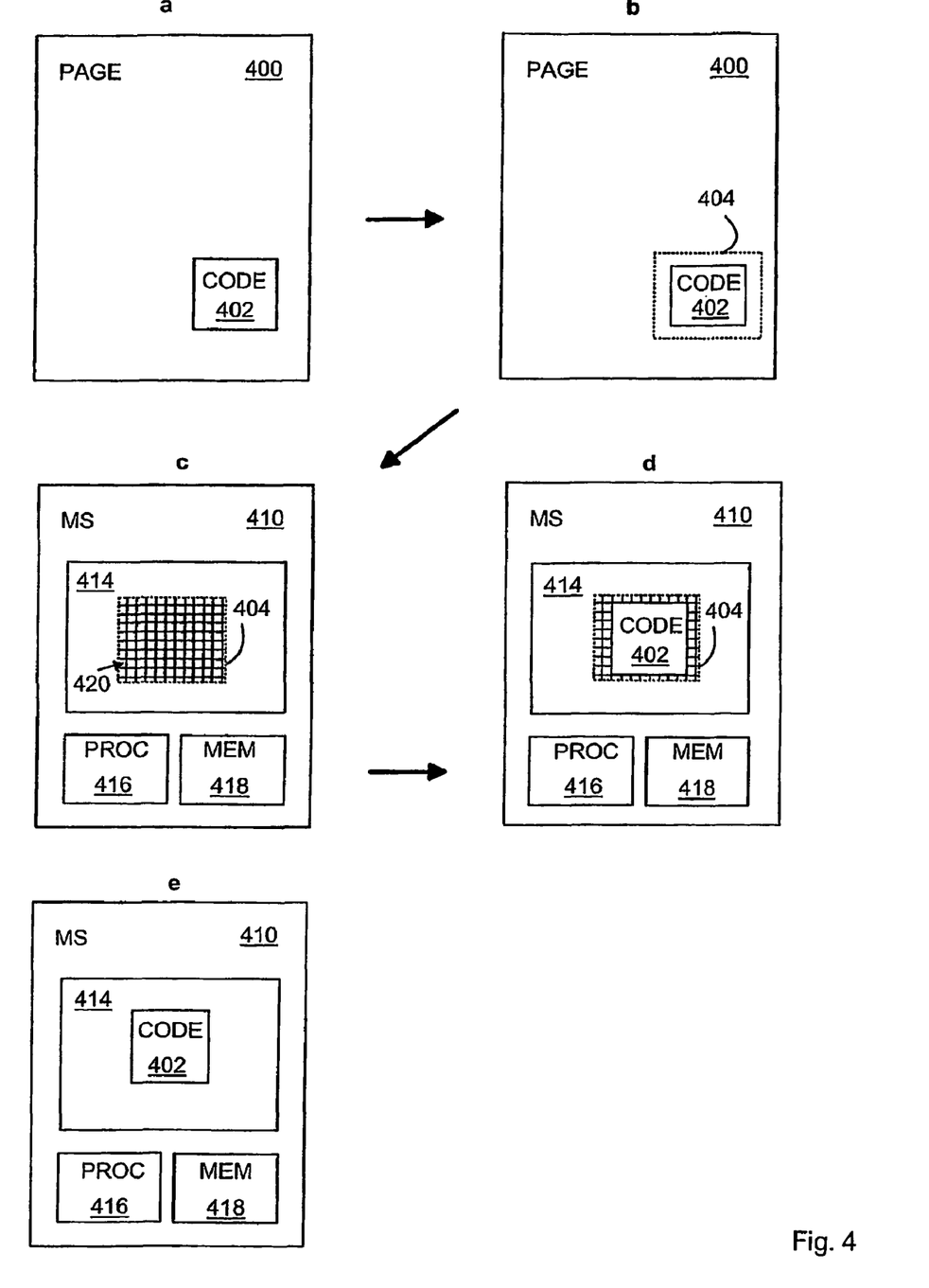
FIG. 4 shows one embodiment of the arrangement.

FIG. 4 illustrates a device implementation of the method according to FIG. 1. Box "a" shows a page 400 of a book or magazine with a smart code 402.

Box "b" illustrates a situation in which a mobile phone takes a picture containing the smart code 402. Frame 404 shows the frames of the picture being taken.

Box "c" examines the situation from the viewpoint of the mobile phone 410. The mobile phone has a display 414, processor 416, and memory 418. It is clear that the mobile phone also has other functionalities, but they are not essential for the description of the invention. Box "c" illustrates how the frame window 404 containing the code is split into several sub-windows. For the sake of illustration, box "c" shows the split code on the display of the mobile phone, though this is not necessarily the case in practice. In practice, the image can be stored in numerical format in the memory 418 of the mobile phone for processing with the processor 416.

Box "d" illustrates how, in the split original frame 404, the sub-windows are located that may be part of the code 402. Box e illustrates how the desired code is found and can be shown on the display of the mobile phone 410. The found code 412 can be so good that it can be used as such, or the code can be further processed by filtering, making check calculations in accordance with the standard, or in some other manner.

Figure 5:
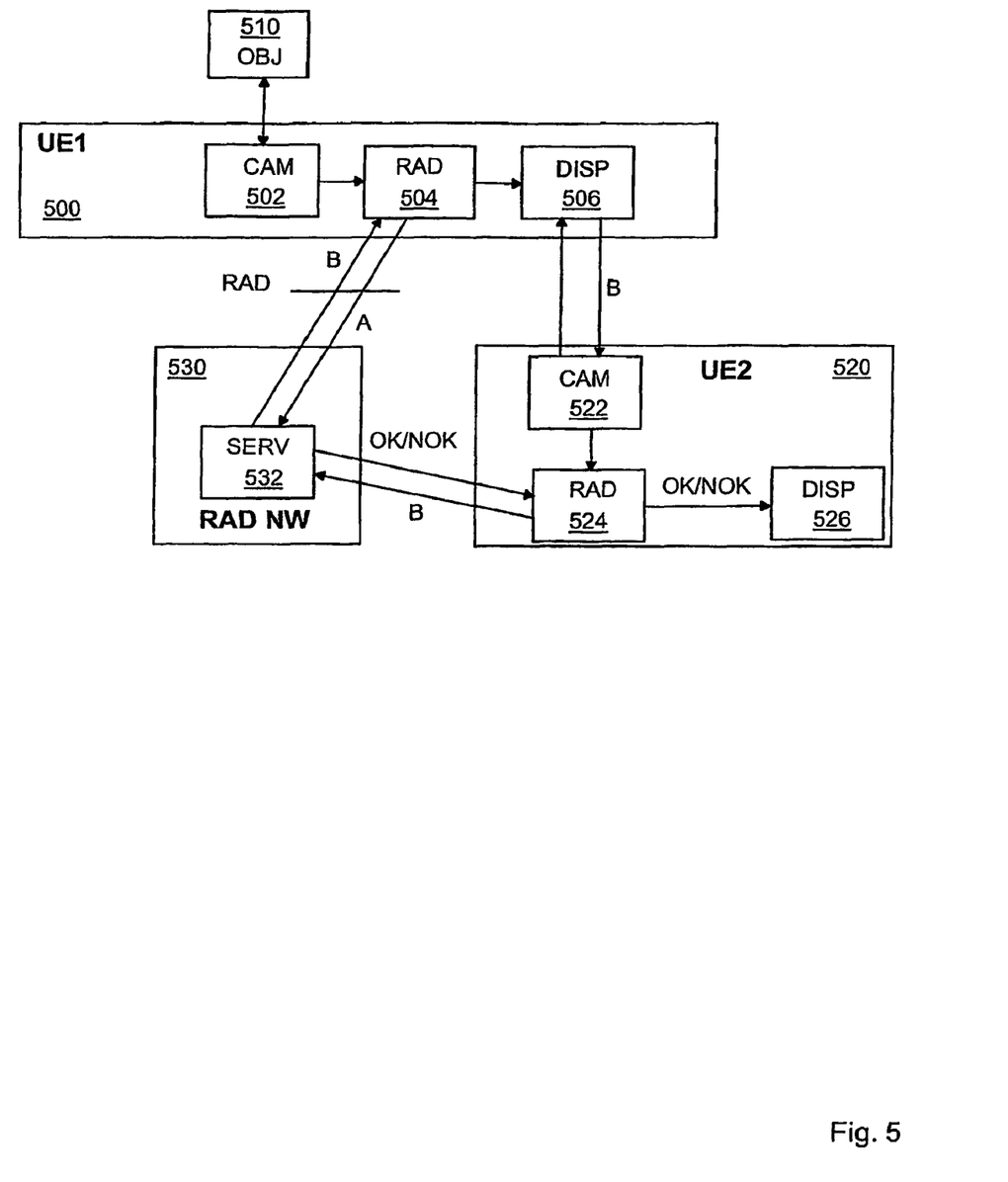
FIG. 5 shows a second embodiment of the arrangement.

FIG. 5 shows an embodiment that uses a code file. It is an embodiment for arranging real-time information in a communications system. The method comprises a first terminal and a second terminal. The first terminal is arranged to read a non-real-time code and receive a unique security code for the non-real-time code. The second terminal is arranged to read the security code from the display of the first terminal, and to check its authenticity.

The solution in question can be used in safety arrangements, money transfer, various ticket purchasing solutions, money games, lotteries, and corresponding situations.

One example is purchasing a cinema ticket, which is described using the arrangement of FIG. 5. The buyer of a ticket sees a cinema advertisement that has a smart code 510 printed on it, the code being herein referred to as a purchase code. The buyer takes a picture of the purchase code with the camera 502 of his or her mobile phone in such a manner that the purchase code fits within the window defined by the camera. The purchase code can be identified with methods according to FIGS. 1 and 2, for instance, and it can be enhanced with the filtering of FIG. 3.

Check sum calculations can be made on the purchase code in such a manner that the terminal of the buyer knows that the decoded purchase code is correct. The thus obtained purchase code A is transmitted for instance wirelessly over a radio interface RAD with communications means 504 of the buyers terminal 500 to a server 532 managing the sales of cinema tickets, which can be seen as part of a radio network 530. The server 532 forms a security code B of the received purchase code.

The security code can be selected on the basis of the purchase code from a predefined group of security codes, for instance. In other words, a specific purchase code (cinema ticket) can lead to selecting the security code from one group of security codes, and another specific purchase code (theatre ticket) can lead to selecting the security code from another group of security codes. Alternatively, the security code is generated on the basis of a predefined algorithm in response to the purchase code received by the server/administrative unit. The security code can for instance be generated randomly. In one embodiment the reception of a first matrix code by the server triggers the generation of a security code. The first and second codes do not necessarily have any common information content, and the second code can be generated regardless of the information content of the first code.

The security code is unique and event-specific, that is, the server 532 does not provide the same security code in response to any other terminal that reads the same general code in the cinema advertisement as the first buyer. If the server selects the security code from a database it manages, it can set an indicator to the database to show that the security code has already been assigned for use. The same security code can then no longer be given to another user at least before the security code has been used as an entry ticket to the cinema, for example. After the code has been used, it can in one embodiment be re-allocated for use.

The customer arrives at the cinema and has in his or her terminal, such as mobile phone 500, the received security code B. The attendant of the cinema has a terminal 520 and with a camera 522 of the terminal s/he reads the security code B from the display of the customer's terminal. The attendant's terminal 520 contacts with communications means 524 the server 530 that can be the above-mentioned server, but this is not necessary as long as the server has access to information on the granted security codes. In other words, if the servers through which the first and second terminals communicate with each other are different servers, or administrative units, they can have between them a data transmission connection so that the server contacted by the second terminal knows the security codes granted by the first server.

The terminal 520 of the attendant transmits the security code B to the server 530 that verifies that the security code B is valid and entitles entry to the cinema. After the server 530 has transmitted an acknowledgement [OK or NOK (not ok)] to the attendant's terminal that the security code is valid, the server 532 can cross over the security code B from its database so that the same security code cannot be utilised by someone else. Alternatively, the server can mark the security code as allocated in the database. After a security code has been used, the server may take it into use again for allocation to a different terminal that needs a security code on the basis of a purchase code. The information (OK/NOK) received from the server can be shown on the display of the second terminal or indicated by an audio signal, for instance.

There can be a radio link, such as a GSM radio link, between the first and second terminals. The link between the second terminal and the server can be a Bluetooth link, for instance, which is a fast link and thus well suited for the embodiment described above, in which the authentication of the security code must be quick so as not to slow the processing of the line in the cinema.

Figure 6:
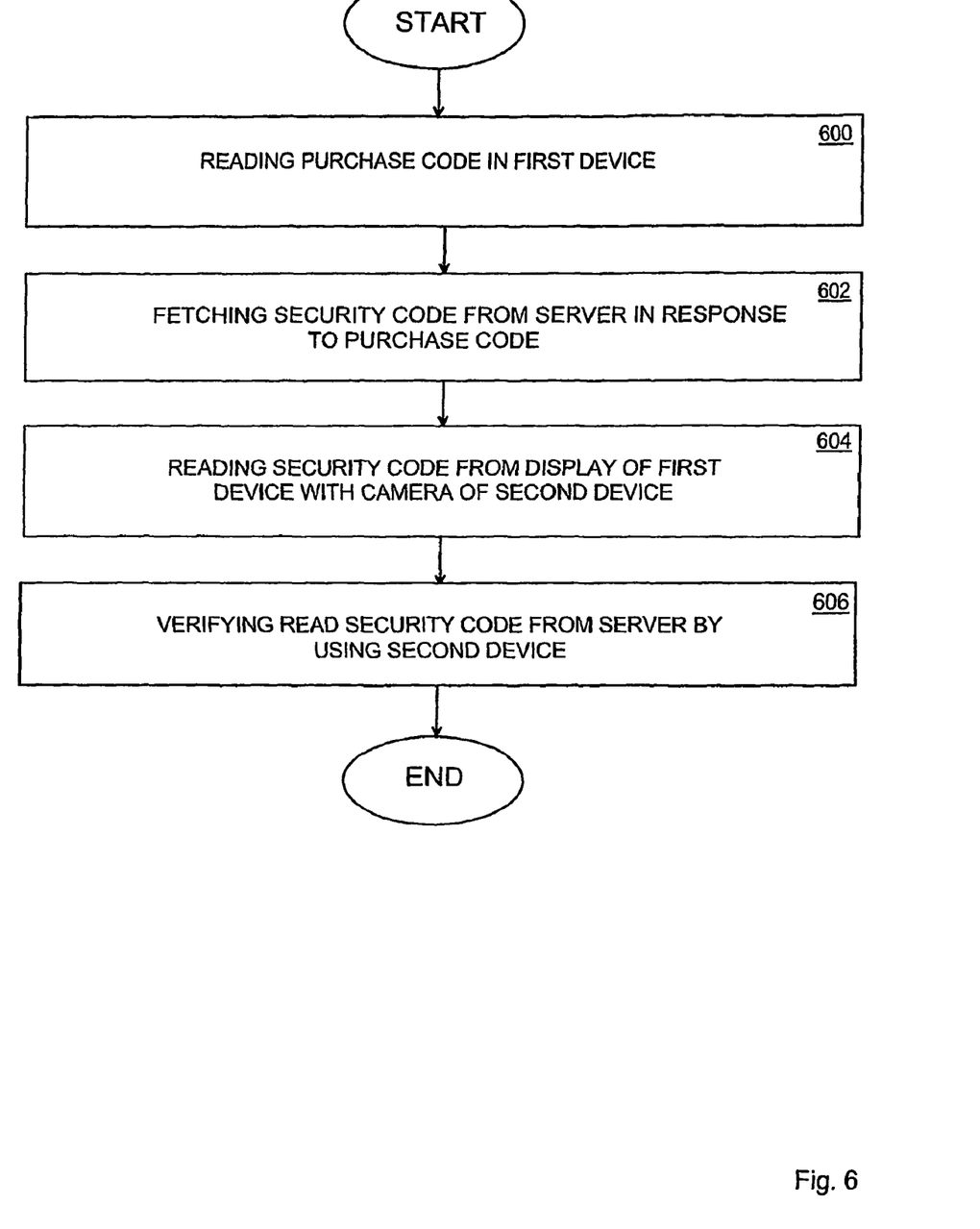
FIG. 6 shows a fourth embodiment of the method.

FIG. 6 shows a method corresponding to the arrangement of FIG. 5. In step 600, a first terminal reads a purchase code. In step 602, a verification code is fetched from a server in response to the purchase code. In step 604, the verification code is read with a second device from the display of the first device. In step 606, the verification code is authenticated from the server with the second device. The authentication information can be shown on the display of the second device or indicated by an audio signal, for instance.

The phone-to-phone type method described above provides advantages especially when the managed product is information, such as an entry ticket. Special data transmission safety can be achieved by having the two terminals interwork with the server. The server can then provide the terminal with a time stamped code, for instance, and the terminals can synchronize with the time stamp in such a manner, for example, that they transmit information to the server at a time specified by the server. The transmission routes of the data being transmitted can also be manipulated to prevent misuse.

The advantage of the process of reading from the display of the first mobile phone with the camera of the second mobile phone is that the second mobile phone need not be equipped with a separate, expensive bar code/matrix code reader, and it is possible to use for instance solutions according to the embodiments described above to enable reading from the display with a camera. The use of mobile phones also allows the purchase events not to be bound to a specific place. In the above embodiment, the first terminal can read the first matrix code from any physical cinema advertisement, newspaper, or computer display (the Internet).

The server can also receive several codes from the same terminal, or from different terminals, and perform calculations on them. For instance, the server can form of the codes a sum code to be used as a security code, and the server can return the code to one or more terminals.

In one embodiment, the smart code is used in the copy protection of goods. For instance, it is possible to add a smart code to CD boxes in a record shop. The smart codes can be random and unique so that no two records have the same code.

At the time of the purchase, the vendor reads the code from the CD with a mobile phone or a corresponding reader. The device operated by the vendor contacts a control server and transmits the read code to it. The server receives the code and crosses it over in its database so that the same code cannot be used again. The server then transmits an acknowledgement to the vendors terminal indicating that the operation is finished. A receipt can be printed out to the customer verifying that the bought CD is legal and appropriately verified. The method provides the advantage that the CD and its box cannot be duplicated. No one can copy the original CD package and sell it with the same code, because the verification procedure reveals it as a copy.

It is apparent to a person skilled in the art that as technology advances, the basic idea of the invention can be implemented in many different ways. The invention and its embodiments are thus not restricted to the examples described above, but can vary within the scope of the claims.

The invention claimed is:

1. A mobile station, comprising:
   means for forming an image window from a target comprising a readable code;
   means for dividing the image window into sub-windows;
   means for analysing for each sub-window whether it constitutes a part of the code by comparing the variation density colour of the sub-window with one or more threshold values set for the colour;
   means for gathering the sub-windows evaluated as constituting a part of the code into a group of sub-windows; and
   means for verifying that the gathered group of sub-windows defines a valid code.

2. The mobile station of claim 1, further comprising
   means for performing a grey-scale analysis on each sub-window;
   means for interpreting a sub-window exceeding a preset white variation density threshold as white and means for interpreting a sub-window exceeding a preset black variation density threshold as black.

3. The mobile station of claim 2, further comprising means for rejecting sub-windows whose colour variation density falls between the preset white variation density threshold and the preset black variation density threshold.

4. The mobile station of claim 2, further comprising means for setting the white variation density threshold and the black variation density threshold based on lighting conditions.

5. The mobile station of claim 2, further comprising means for verifying that the gathered group of sub-windows defines a valid code if a predetermined percentage of the sub-windows are interpreted either as white or black.

6. The mobile station of claim 1, further comprising means for verifying that the gathered group of sub-windows defines a valid code if a predetermined condition set on a shape of the group of sub-windows is met.

7. The mobile station of claim 6, wherein the predetermined condition set on the shape is that the group of sub-windows form a square shape.

8. The mobile station of claim 1, further comprising:
   means for determining a centre point of the image window;
   means for determining three corner points of the code in the image window that optimally form a L-shape with respect to the centre point; and
   means for determining, on the basis of the found three corner points, a fourth corner point of the code; and
   means for specifying the code to be defined by an area limited by the four corner points.

9. The mobile station of claim 1, further comprising:
   means for scanning the image window with a two-dimensional scanning window in which one dimension is equal to the longitudinal or lateral dimension of the image window and in the other dimension equal to the size of a structural element of the image;
   means for evaluating, in each scanning round, if a predetermined condition for finding an edge of the code is found; and
   means for specifying the location of the code on the basis of one or more found edges of the code.

10. The mobile station of claim 1, further comprising means for verifying the code by performing a checksum test on the code.

11. A method of locating a code in an image file, the method comprising:
    performing the following steps by a mobile station;
    forming an image window from a target comprising a readable code;
    dividing the image window into sub-windows;
    analysing for each sub-window whether it constitutes a part of the code by comparing the variation density colour of the sub-window with one or more threshold values set for the colour;
    gathering the sub-windows evaluated as constituting a part of the code into a group of sub-windows; and
    verifying that the gathered group of sub-windows defines a valid code.

12. The method of claim 11, further comprising:
    performing a grey-scale analysis on each sub-window;
    interpreting each sub-window exceeding a preset white variation density threshold as white, and each sub-window exceeding a preset black variation density threshold as black;
    rejecting such sub-windows whose colour variation density falls between a preset white variation density threshold and a preset black variation density threshold; and
    verifying that the gathered group of sub-windows defines a valid code if a predetermined percentage of the sub-windows are either white or black.

13. The method of claim 12, wherein setting the white variation density threshold and the black variation density threshold based on lighting conditions.

14. The method of claim 11, wherein it is verified that the gathered group of sub-windows defines a valid code if a predetermined condition set on a shape of the group of sub-windows is met.

15. The method of claim 11, further comprising:
    determining a centre point of the image window;
    determining three corner points of the code in the image window that optimally form a L-shape with respect to the centre point; and
    determining, on the basis of the found three corner points, a fourth corner point of the code; and
    specifying the code to be defined by an area limited by the four corner points.

16. The method of claim 11, further comprising:
    scanning the image window with a two-dimensional scanning window in which one dimension is equal to the longitudinal or lateral dimension of the image window and in the other dimension equal to the size of a structural element of the image;
    evaluating, in each scanning round, if a predetermined condition for finding an edge of the code is found; and
    specifying the location of the code on the basis of one or more found edges of the code.

17. The method of claim 11, further comprising verifying the code by performing a checksum test on the code.

18. A computer-readable medium including a computer program product stored thereon, the computer program product for locating a code in an image file, comprising:
    computer code for forming an image window from a target comprising a readable code;
    computer code for dividing the image window into sub-windows;
    computer code for analysing for each sub-window whether it constitutes a part of the code by comparing the variation density colour of the sub-window with one or more threshold values set for the colour;
    computer code for gathering the sub-windows evaluated as constituting a part of the code into a group of sub-windows; and
    computer code for verifying that the gathered group of sub-windows defines a valid code.

* * * * *